United States Patent [19]

Camphausen

[11] 3,943,528

[45] Mar. 9, 1976

[54] METHOD FOR PRODUCING AN IMAGE USING PERSISTENT ELECTROCHROMIC MATERIALS

[75] Inventor: Don L. Camphausen, Fairport, N.Y.

[73] Assignee: Xerox Corporation, Stamford, Conn.

[22] Filed: Apr. 25, 1974

[21] Appl. No.: 463,928

[52] U.S. Cl. ............ 346/74 E; 178/6.6 A; 346/74 P
[51] Int. Cl.² ................ G03G 13/052; G01D 15/06
[58] Field of Search............ 346/74 P, 74 ES, 74 EL, 346/74 R; 178/6.6 A; 350/160

[56] References Cited
UNITED STATES PATENTS

| | | | |
|---|---|---|---|
| 3,511,973 | 5/1970 | Best | 346/74 P |
| 3,521,941 | 7/1970 | Deb et al. | 350/160 |
| 3,654,095 | 4/1972 | Koontz | 346/74 E |
| 3,747,119 | 7/1973 | Matkan | 346/74 P |
| 3,795,011 | 2/1974 | Ohta | 346/74 E |
| 3,818,492 | 6/1974 | Matkan | 346/74 P |

Primary Examiner—Bernard Konick
Assistant Examiner—Jay P. Lucas
Attorney, Agent, or Firm—James J. Ralabate; James P. O'Sullivan; Jerome L. Jeffers

[57] ABSTRACT

Disclosed is an imaging method useful in facsimile transmission. The method involves passing an electrical current through a receiving member of a solid state persistent electrochromic material uniformly distributed on the surface of a substrate. The substrate comprises a surface material on a ground plane. The surface material is a material which becomes more conductive upon being heated or wetted and is returned to its original state of resistivity upon cooling or drying. The surface material is heated or wetted to increase its conductivity and thereby reduce its resistance to a level less than or about equal to that of the electrochromic material whereupon an electrical current is passed through the electrochromic material in imagewise configuration to thereby form an image. Upon formation of the image, it is fixed by cooling or drying the surface material.

19 Claims, No Drawings

METHOD FOR PRODUCING AN IMAGE USING PERSISTENT ELECTROCHROMIC MATERIALS

BACKGROUND OF THE INVENTION

Various methods of facsimile transmission, i.e. the transmission by electrical or optical means of graphic material such as pictures, printed matter, maps, etc., are known. There are four methods of transmission in use; transmission by radio, by land telephone lines, by submarine cable and by the newly developed optical fiber transmission. Each of these introduces its own problems, but the fundamentals of the system are the same for all. The material must be broken into sequential elementary parts which may be transmitted by electrical or optical means and then the parts converted back into a graphic presentation at the receiver. The graphic material is broken into the sequence of elemental parts by the process of scanning. This may be done by mounting the material, e.g. a printed page, on a revolving drum and projecting a small beam of light on or through it. The light is reflected to a phototube with the light and hence the phototube output being proportional to the picture density. The light is moved along the sheet, parallel to the axis of the drum, at such a rate that it displaces axially its own width for each revolution of the drum. Thus, the spot of light progressively scans every spot on the picture. The graphic material can also be scanned by solid-state image sensors such as a charge-coupled device (CCD) or a charge injection device (CID). The output of the phototube is an electrical breakdown of the picture which is modified for transmission and transmitted. At the receiving end, the signal is fed into a recorder which is generally one of two basic types. The first type depends upon the projection of a variable light upon a photographic paper or film resulting in a spot of light whose intensity varies with the varying intensity of the graphic material being transmitted. The other type of recording, to which the present invention may be applied, utilizes a receiving member sensitized to electrical current passage and passes the received signal or another signal triggered by the received signal through it to cause a color change. There are at least four electrolytic mechanisms by which electrical energy can cause the formation of color in a sensitized receiving member, i.e., a. by the introduction of foreign ions into the receiving member;

b. by the discharge of ions at an electrode in contact with the receiving member;

c. by increasing the concentration of a particular ion at the surface of an electrode in contact with the receiving member (pH change); and d. by oxidation or reduction of an electrochromic material at the electrode surface.

The process of the present invention is an improvement to the method designated as (d), that is, the oxidation or reduction of an electrochromic material. An electrochromic material may be defined as a substance whose optical transmission or reflection properties are altered by an interaction with an electronic charge. A persistent electrochromic (PEC) is defined as one which is responsive to the application of an electric field by changing from a first persistent state in which it is essentially non-absorbing to radiation in a given wavelength to a second persistent state which absorbs in that wavelength region. The term persistent indicates that the material can remain in either state when the applied electric field is removed as distinguished from the case of instantaneous reversion to the non-absorbing state when the field is removed.

The use of certain persistent electrochromic materials in imaging systems is disclosed in British Pat. No. 1,186,541 and U.S. Pat. No. 3,521,941. These patents disclose the use of certain transition metal compounds, e.g. molybdenum oxide and niobium oxide, sandwiched between two electrodes so that their color changes when a potential is created between the electrodes. In one example, the first electrode is formed of NESA glass, a commercially available product having a transparent coating of conductive tin oxide on one surface of a glass sheet. The electrochromic material is vacuum deposited onto the tin oxide bearing surface of the glass and a layer of a conductive material, e.g. gold, is deposited onto the surface to form a sandwich of the electrochromic material between the electrodes. The patents disclose a preferred embodiment in which an insulating layer is deposited between one of the electrodes and the electrochromic material which is said to render the electrochromic layer more sensitive to a field of opposite polarity to return it to the absorption characteristic state it occupied prior to the application of the field. A plate containing such an insulating material is disclosed as being imaged by a movable probe or stylus for use in information storage and transmission and the so-formed image is taught to be erasable by rubbing a relatively broad area electrode across the surface of the plate with the potentials suitably reversed.

The above-described three-layered system, i.e., NESA glass, electrochromic material and conductive overcoating, suffers from two disadvantages. The first is that it does not have the requisite flexibility for use in conventional drum-type facsimile receivers in which a sheet of recording paper is wrapped around a rotating drum with a stylus mounted to move perpendicular to the direction of drum rotation used as the movable electrode. The second is that it is not self-fixing since once the plate is fabricated and imaged, it can be reimaged to the point of obliterating the intelligence contained thereon from the initial imaging by the application of a potential between the electrodes. The four-layered structure suffers from a further disadvantage since the application of the insulating layer requires an extra fabricating step in addition to rendering the plate even more inflexible.

It would be desirable, and it is an object of the present invention to provide a novel system for the creation of images by the conversion of a persistent electrochromic material from a first absorptive state to a second absorptive state in which it absorbs light of the desired wavelength.

A further object is to provide a novel process for recording graphic material in a facsimile transmission system.

An additional object is to provide such a process in which the graphic material is recorded by converting a persistent electrochromic material from a non-absorbing state to an absorbing state in imagewise configuration corresponding to the image being transmitted.

A further object is to provide such a process in which the persistent electrochromic material is distributed on a flexible substrate which can be wrapped around a drum in a facsimile receiving apparatus.

An additional object is to provide such a process in which the image is fixable so as to render it immune from further imaging.

SUMMARY OF THE INVENTION

The present invention is an imaging method which utilizes the ability of persistent electrochromic materials to undergo a change in their optical density when an electrical current is passed through them. The method comprises:

a. providing a receiving member comprised of a solid state persistent electrochromic material uniformly distributed upon a substrate of a surface material which has a resistivity substantially greater than the electrochromic material on a conductive ground plane;

b. treating the surface material to increase its conductivity and thereby reduce its resistance to a level less than or about equal to that of the electrochromic material;

c. passing an electrical current through the electrochromic material by creating a potential between a movable electrode and the substrate and moving the electrode in imagewise configuration to thereby form an image in the electrochromic material; and d. converting the surface material back to its original state of resistance greater than that of the electrochromic material.

DETAILED DESCRIPTION

The receiving member for use in the process of the present invention is prepared by depositing a film of a persistent electrochromic material onto a surface which has a resistivity greater than that of the electrochromic material and which can be caused to become more highly conductive by the application of an external stimulus to thereby lower its resistivity to a level less than or equal to the electrochromic material. The surface material is supported by a conductive ground plane as backing element. The surface material and conductive ground plane are referred to herein as the substrate.

A class of materials which can be used to form the surface between the electrochromic material and the ground plane are polymers such as polystyrene, poly(ethylene) and poly(ethylene terephthalate) which become more conductive upon being heated and return to their original state of conductivity when cooled.

In another embodiment, the electrochromic material is deposited on an electrical switching device which when exposed to a high field changes from a highly resistive state to a conducting state. This phenomena is more fully described by S. R. Ovshinsky in Phys. Rev. Letters 21, 1450 (1968).

An alternative method of providing a surface which can be rendered more conductive by the application of an external stimulus is to employ a photoconductive surface material. This can be accomplished through the use of a self-supporting photoconductive binder layer in which a photoconductive material such as ZnO is dispersed in a thermoplastic resin matrix. Alternatively, the photoconductive material can be uniformly deposited on the surface of a transparent ground plane. By depositing the persistent electrochromic material on one surface of the photoconductive substrate and uniformly exposing the substrate to electromagnetic radiation from the opposite side, the necessary change in conductivity can be achieved. Termination of the electromagnetic radiation returns the substrate to its original resistance.

A preferred surface material is selected from those papers which are highly resistive when dry but when moistened become more conductive. As used herein, the term paper is used to describe a sheet material made up of many small discrete fibers bonded together. Most commonly, the fibers are cellulosic in nature and are formed into a sheet on a wire screen from a dilute water suspension. Other fibers, usually mineral or synthetic, may be formed into sheets by this or other techniques.

In order for the paper to become more conductive upon being wetted, it must necessarily have a fairly low water resistance. Water resistance refers to that property of a sheet which resists passage of liquid water into or through it. Whether or not a given type of paper possesses a sufficiently low water resistance can readily be determined by routine experimentation. Wetting agents, such as $H_2O$ or alcohol, are sufficiently conductive to increase the paper's conductivity to the necessary level. More resistive wetting materials can be used since they may release electrolytes contained in the paper whose subsequent transport provides the requisite conduction. The paper is returned to its original state of resistance by drying.

During operation, the surface material is in contact with a conductive ground plane as backing element which may be in the form of a metal drum. Materials which are less conductive than metal such as black construction paper which may be impregnated with carbon or conductive rubber may be used.

Suitable electrochromic materials for use in the present invention are those compositions which are responsive to the application of an electric field in that they change from a first state in which they are essentially non-absorbing to radiation having wavelengths in the visible region to a second state which absorbs in that wavelength region. Only those electrochromic materials which are persistent, i.e., that remain in the absorptive state for a perceivable period of time after termination of the electric field, are contemplated for use in the process of the present invention.

One class of electrochromic material which can be used is made up of certain alkali metal halides, e.g. NaCl RbCl, KCl, LiF, NaBr, KBr, KI and RbBr. This class of electrochromic materials suffers from the disadvantage of being persistent only at elevated temperatures.

A preferred class of persistent electrochromic materials are the oxides, sulfides, oxysulfides, halides, selenides, tellurides, arsenides, phosphides, nitrides, chromates, molybdates, tungstates, vanodates, niobates, tantalates, titanates, stannates, zirconates and manganates of cations which can exist in different stable oxidation states at temperatures of −50° to 125° C. wherein the different oxidation states have different electromagnetic radiation absorption characteristics. Suitable cations are selected from groups IB, IIB, IIIB, IVB, VB, VIB, VIII, IIIA, IVA and VA as well as the Lanthanaide series of the periodic table. Preferred cations are those which may exist in any oxidation state from +2 to +8 at ambient temperatures. Preferred compositions are the oxides and sulfides of the metals of Groups IB, IVA and VA and the Lanthanide series. Exemplary of suitable electrochromic materials are $WO_3$, $MoO_3$, $CuO$, $CuMoO_4$, $CuWO_4 \cdot 2H_2O$, $CuS$, $Cu_3O_4$, $CuWO_4$, $Co_2S_3$, $CoS$, $MoS_3$, $MoWO_4$, $MoS_2$, $SnS$, $TiS_2$, $TiO$, $VO$, $NiO$, $CeO_2$, $Ce_2S_3$ and $SnSe$.

The electrochromic material can be applied to the surface material by any convenient method such as electron beam evaporation, resistive heating evaporation or sputtering. When the electrochromic material is to be the oxide of a refractory metal, it can be deposited by high temperature oxidation. This method is described in U.S. Department of Commerce publication PB 161736. The film may be deposited on the substrate to any convenient depth since film thickness is not critical. Typically, the film is deposited to a thickness of from 100 A to 20,000 A and preferably to a thickness of from 500 A to 10,000 A. Films of less than 500 A are less preferred since the total number of absorbing color centers is small and the optical density obtainable is quite low. Films of a thickness greater than 10,000 A may tend to flake off as the substrate is flexed. In addition, since resistance is a function of thickness, very thick films will require the input of more energy than will films within the preferred range of thickness.

A preferred method of using the imaging system of the present invention is in facsimile transmission, i.e., the transmission by electrical or optical means of graphic material in which the material is broken into sequential elementary parts which are transmitted and then converted back into a graphic presentation at a receiver. At the receiver, an electrical potential is created between a movable electrode and a conductive receiving member sensitized to passage of electrical current to thereby pass the received signal current through the receiving member in imagewise configuration corresponding to the graphic material being transmitted.

Typically, facsimile receivers employ a stylus as the movable electrode. Preferably, the stylus is made of a tungsten wire 6 to 10 mils in diameter. Tungsten is preferred because of its strength and hardness and an even finer stylus may be used where exceptional sharpness is desired. A light stylus pressure is desirable. Though tungsten is preferred for long life, a stainless steel or iron stylus is often used.

Conventional facsimile receivers employ d.c. bias of from 800 to 1000 volts or pulsing with a d.c. or alternating voltage of 1100 volts or higher. Recording with pulsed d.c. or a.c. results in a series of dots on the receiving member which will appear as a continuous line if the frequency and scanning rate are in proportion. Facsimile receiving by means of the instant invention can be accomplished by the use of lower voltages since electrochromic materials are more sensitive to current passage than are marking materials in general use. Typically, a d.c. electric field of $\simeq 10^4$ V/cm to $10^5$ V/cm or a pulsed d.c. or a.c. electric field may be employed across the electrochromic material.

The method of practicing the present invention is further illustrated by the following examples.

EXAMPLE I

A $WO_3$ layer is vacuum evaporated at a pressure of $10^{-5}$ torr onto a paper substrate to a thickness of about 100 A. The paper is wetted from the side opposite the layer of $WO_3$ to increase its conductivity and placed in contact with a sheet of conductive black construction paper as the ground plane. The coated paper appears white and feels normal before and after wetting. A platinum stylus is used as the other electrode with the electrodes being connected through a battery capable of creating an electrical potential between them.

With no potential or a positive potential applied to the stylus up to 50 volts, no mark is created. A bias of 9 volts applied between the electrodes with the stylus negative creates a blue mark in the areas contacted by the stylus having a reflection density of approximately 0.2 to 0.3 as determined by independent microdensitometer measurements using white light. The background remains white since those areas of the $WO_3$ not contacted by the stylus remain transparent. With a potential of 50 volts applied between the electrodes such that the stylus is negative, the stylus can be moved rapidly and still create marks in the electrochromic material. Allowing the paper to dry, a process which can be accelerated by heating, renders the paper considerably more resistive than the $WO_3$ and, therefore, prevents further imaging by the application of an electrical potential of the magnitude mentioned above. The image created is persistent since it remains visible after the current flow is terminated. However, the image does tend to self-bleach over a period of about 12 hours when using $WO_3$ as the electrochromic material.

EXAMPLE II

A paper substrate is coated with a layer of $MoO_3$ to a thickness of between 500 A and 1000 A and contacted with a sheet of conductive black construction paper to form a substrate by the method described in Example I. The coated paper appears to have a bluish tint indicating the presence of some original color centers before wetting. The blue color increases slightly within 15 minutes after wetting without the application of a potential. Blue marks having optical densities of approximately 0.2 above the background are created with the metal stylus without passing current through the $MoO_3$ layer. A positive potential applied between the electrodes does not enhance the color of the mark. Application of a negative potential of 2 to 50 volts creates deeper blue marks having optical densities up to 0.6 relative to white paper thereby creating a distinct image in the $MoO_3$ corresponding to the areas in which current is passed through the layer.

What is claimed is:

1. An imaging method which comprises:
   a. providing a receiving member comprised of a solid state persistent electrochromic material uniformly distributed upon a substrate of a surface material which has a resistivity substantially greater than the electrochromic material on a ground plane; said surface material being a material which becomes more conductive upon being heated and is returned to its original state of resistance by cooling,
   b. treating the surface material by heating it to increase its conductivity and thereby reduce its resistance to a level less than or about equal to that of the electrochromic material;
   c. passing an electrical current through the electrochromic material by creating a potential between a movable electrode and the ground plane and moving the electrode in imagewise configuration to thereby form an image in the electrochromic material; and
   d. converting the surface material back to its original state of resistance greater than that of the electrochromic material by cooling it.

2. The method of claim 1 wherein the persistent electrochromic material is an alkali metal halide.

3. The method of claim 2 wherein the alkali metal halide is NaCl, RbCl, KCl, LiF, NaBr, KBr, KI or RbBr.

4. The method of claim 1 wherein the persistent electrochromic material is an oxide, sulfide, oxysulfide, halide, selenide, telluride, arsenide, phosphide, nitride, chromate, molybdate, tungstate, vanodate, niobate, tantalate, titanate, stannate, zirconate or manganate of a cation selected from group IB, IIB, IIIB, IVB, VB, VIB, VIII, IIIA, IVA, VA or the Lanthanide series of the periodic table.

5. The method of claim 4 wherein the persistent electrochromic material is an oxide or sulfide of a cation selected from group IB, IVA, VA or the Lanthanide series of the periodic table.

6. The method of claim 4 wherein the persistent electrochromic material is $WO_3$, $MoO_3$, $CuO$, $CuMoO_4$, $CuWO_4 \cdot 2H_2O$, $CuS$, $Cu_3O_4$, $CuWO_4$, $Co_2S_3$, $CoS$, $MoS_3$, $MoWO_4$, $MoS_2$, $SnS$, $TiS_2$, $TiO$, $VO$, $NiO$, $CeO_2$, $Ce_2S_3$ or $SnSe$.

7. The method of claim 1 wherein the persistent electrochromic material is distributed on the substrate to a thickness of from 100 A to 20,000 A.

8. The method of claim 7 wherein the thickness is from 500 A to 10,000 A.

9. The method of claim 1 wherein the movable electrode is a metal stylus and the current is provided by creating a potential between the treated substrate and the stylus such that the stylus is negative.

10. An imaging method which comprises:
  a. providing a receiving member comprised of a solid state persistent electrochromic material uniformly distributed upon a substrate of a surface material which has a resistivity substantially greater than the electrochromic material on a ground plane; said surface material being a paper which becomes more conductive upon being wetted and is capable of returning to its original state of resistance by drying;
  b. treating the surface material by wetting it to increase its conductivity and thereby reduce its resistance to a level less than or about equal to that of the electrochromic material;
  c. passing an electrical current through the electrochromic material by creating a potential between a movable electrode and the ground plane and moving the electrode in imagewise configuration to thereby form an image in the electrochromic material; and
  d. converting the surface material back to its original state of resistance greater than that of the electrochromic material by drying it.

11. The method of claim 10 wherein the paper is wetted with water.

12. The method of claim 10 wherein the persistent electrochromic material is an alkali metal halide.

13. The method of claim 12 wherein the alkali metal halide is NaCl, RbCl, KCl, LiF, NaBr, KBr, KI or RbBr.

14. The method of claim 10 wherein the persistent electrochromic material is an oxide, sulfide, oxysulfide, halide, selenide, telluride, arsenide, phosphide, nitride, chromate, molybdate, tungstate, vanodate, niobate, tantalate, titanate, stannate, zirconate or manganate of a cation selected from group IB, IIB, IIIB, IVB, VB, VIB, VIII, IIIA, IVA, VA or the Lanthanide series of the periodic table.

15. The method of claim 14 wherein the persistent electrochromic material is an oxide or sulfide of a cation selected from group IB, IVA, VA or the Lanthanide series of the periodic table.

16. The method of claim 14 wherein the persistent electrochromic material is $WO_3$, $MoO_3$, $CuO$, $CuMoO_4$, $CuWO_4 \cdot 2H_2O$, $CuS$, $Cu_3O_4$, $CuWO_4$, $Co_2S_3$, $CoS$, $MoS_3$, $MoWO_4$, $MoS_2$, $SnS$, $TiS_2$, $TiO$, $VO$, $NiO$, $CeO_2$, $Ce_2S_3$, or $SnSe$.

17. The method of claim 10 wherein the persistent electrochromic material is distributed on the substrate to a thickness of from 100 A to 20,000 A.

18. The method of claim 17 wherein the thickness is from 500 A to 10,000 A.

19. The method of claim 10 wherein the movable electrode is a metal stylus and the current is provided by creating a potential between the treated substrate and the stylus such that the stylus is negative.

* * * * *